US006666019B2

(12) United States Patent
Kawatani et al.

(10) Patent No.: US 6,666,019 B2
(45) Date of Patent: Dec. 23, 2003

(54) EXHAUST EMISSION CONTROL SYSTEM OF INTERNAL COMBUSTION ENGINE

(75) Inventors: Toru Kawatani, Tochigi (JP); Kihoko Kaita, Saitama (JP); Shinichi Saito, Tochigi (JP); Takeshi Hashizume, Tochigi (JP); Junya Watanabe, Tochigi (JP); Kenji Kawai, Tochigi (JP); Satoshi Hiranuma, Tochigi (JP); Yoshinaka Takeda, Kanagawa (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/106,222

(22) Filed: Mar. 27, 2002

(65) Prior Publication Data

US 2002/0152744 A1 Oct. 24, 2002

(30) Foreign Application Priority Data

Mar. 27, 2001 (JP) ......................................... 2001-090799

(51) Int. Cl.⁷ ............................................... F01N 3/00
(52) U.S. Cl. ............................. 60/286; 60/274; 60/285; 60/303; 60/295; 123/295; 123/300; 123/305
(58) Field of Search .......................... 60/274, 285, 286, 60/297, 303, 295, 311; 123/299, 300, 305, 295

(56) References Cited

U.S. PATENT DOCUMENTS

| | | | | |
|---|---|---|---|---|
| 5,642,705 A | * | 7/1997 | Morikawa et al. | 123/300 |
| 5,967,113 A | * | 10/1999 | Kaneko et al. | 123/295 |
| 5,975,046 A | * | 11/1999 | Kaneko et al. | 123/300 |
| 6,370,869 B1 | * | 4/2002 | Hirota et al. | 60/276 |
| 6,378,297 B1 | * | 4/2002 | Ito et al. | 60/284 |

* cited by examiner

Primary Examiner—Thomas Denion
Assistant Examiner—Binh Tran
(74) Attorney, Agent, or Firm—Birch, Stewart, Kolasch & Birch, LLP (57) ABSTRACT

An exhaust emission control system of an internal combustion engine capable of post injection is disclosed which provides control such that the injection timing in sub injection is set to a point earlier than the target injection timing when the sub injection is started, and the injection timing in the sub injection is then delayed to the target injection timing. This realizes the post injection under the optimum conditions and enables an efficient rise in the exhaust temperature while inhibiting deterioration of the drivability due to a rapid change in torque.

20 Claims, 5 Drawing Sheets

EXHAUST EMISSION CONTROL SYSTEM OF INTERNAL COMBUSTION ENGINE

BACKGROUND OF THE INVENTION

This non-provisional application claims priority under 35 U.S.C. §119(a) on patent application No. 2001-90799 filed in Japan on Mar. 27, 2001, which is herein incorporated by reference.

1. Field of the Invention

This invention relates to an exhaust emission control system of an internal combustion engine capable of post injection for raising the exhaust temperature.

2. Description of Related Art

An exhaust emission control device is known to reduce harmful matters in exhaust emitted from an internal combustion engine. For example, the exhaust emission control device applied to a diesel engine has a filter disposed in an exhaust passage, and has a function of collecting particulate matters included in exhaust. If the particulate matters have been deposited on the filter to a degree, the exhaust emission control device removes the particulate matters from the filter to recover the collecting capability of the filter. To recover the collecting capability of the filter, the filter is heated using an external heat source such as an electric heater to oxidize the particulate matters by the resulting heat, but it is most preferable to raise the temperature of the filter by means of heat of the exhaust from a standpoint of improvement in total fuel economy and reduction in size of the device as a whole.

Accordingly, a technique has been adopted in which an increasing amount of fuel is supplied according to the load of the internal combustion engine to raise the exhaust temperature by combustion heat of the fuel. In the case of a diesel engine, for example, fuel is injected into each cylinder in main injection and additional fuel is then injected in an expansion stroke (post injection) to raise the exhaust temperature by combustion heat of the fuel.

However, the conditions that realize the combustion as expected by the post injection are greatly influenced by atmosphere in cylinders unlike the self-ignition by main injection or the like. For example, if the cylinder temperature is too low, it is impossible to satisfactorily raise the exhaust temperature since the fuel cannot be completely combusted even if a large quantity of fuel is injected in the post injection. Further, if the post injection timing comes too early in terms of crank angle, a large amount of combustion heat is consumed by torque, resulting in the occurrence of a shock and making it impossible to raise the exhaust temperature as expected. Namely, the conventional exhaust emission control device of the internal combustion engine cannot achieve satisfactory post injection.

SUMMARY OF THE INVENTION

It is therefore an object of the present invention to provide an exhaust emission control system of an internal combustion engine, which realizes post injection with high accuracy to enable an efficient rise in the exhaust temperature.

To accomplish the above object, an exhaust emission control system of an internal combustion engine having a fuel injection device that carries out main injection of fuel into cylinders of the internal combustion engine and then carries out sub injection of additional fuel in an expansion stroke, comprising: an exhaust emission control device disposed in an exhaust passage of the internal combustion engine and is capable of reducing harmful matters in exhaust; an operating state detecting device that detects an operating state of the internal combustion engine; a target injection timing setting device that sets a target injection timing in the sub injection according to the operating state of the internal combustion engine; and a control device that provides control such that injection timing in the sub injection is set at a point earlier than the target injection timing when the sub injection is started, and the injection timing in the sub injection is then delayed to the target injection timing.

Originally, the target values of the fuel injection quantity and injection timing that enable a rise in the exhaust temperature in the most efficient manner in the sub injection can be set according to the operating state of an internal combustion engine such as the engine load and the engine speed.

On the other hand, a combustion heat resulting from the actual sub injection varies according to the conditions of atmosphere in cylinders. For this reason, if the temperature conditions that enable the efficient rise in the exhaust temperature have not yet been satisfied since the cylinder temperature is low, fuel cannot be combusted in an ideal manner even if the sub injection is started at the same injection timing as the target injection timing from the beginning. It is therefore impossible to raise the exhaust temperature as expected.

To address this problem, the exhaust emission control device according to the present invention provides control such that the actual sub injection is started in the injection timing earlier than the set target injection timing, and the injection timing in the sub injection is then delayed to the target injection timing in a predetermined period of time.

Therefore, the required temperature conditions are satisfied prior to the subinjection in the original target injection timing, and the sub injection realizes the efficient combustion and rise in the exhaust temperature at a point in time when the injection timing reaches the target injection timing. This enables an improvement in performance of the exhaust emission control device.

Further, a change in torque can be inhibited to a larger extent than in the case where the post injection is carried out in the target injection timing at a time, and it is therefore possible to prevent the drivability of a vehicle from deteriorating.

BRIEF DESCRIPTION OF DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of the present invention will now be described in detail with reference to the accompanying drawings. The present invention can be implemented by an exhaust emission control system of a diesel engine for vehicles, for example. It should be understood, however, that internal combustion engines to which may be applied the present invention should not be restricted to internal combustion engines for vehicles.

Figure 1:
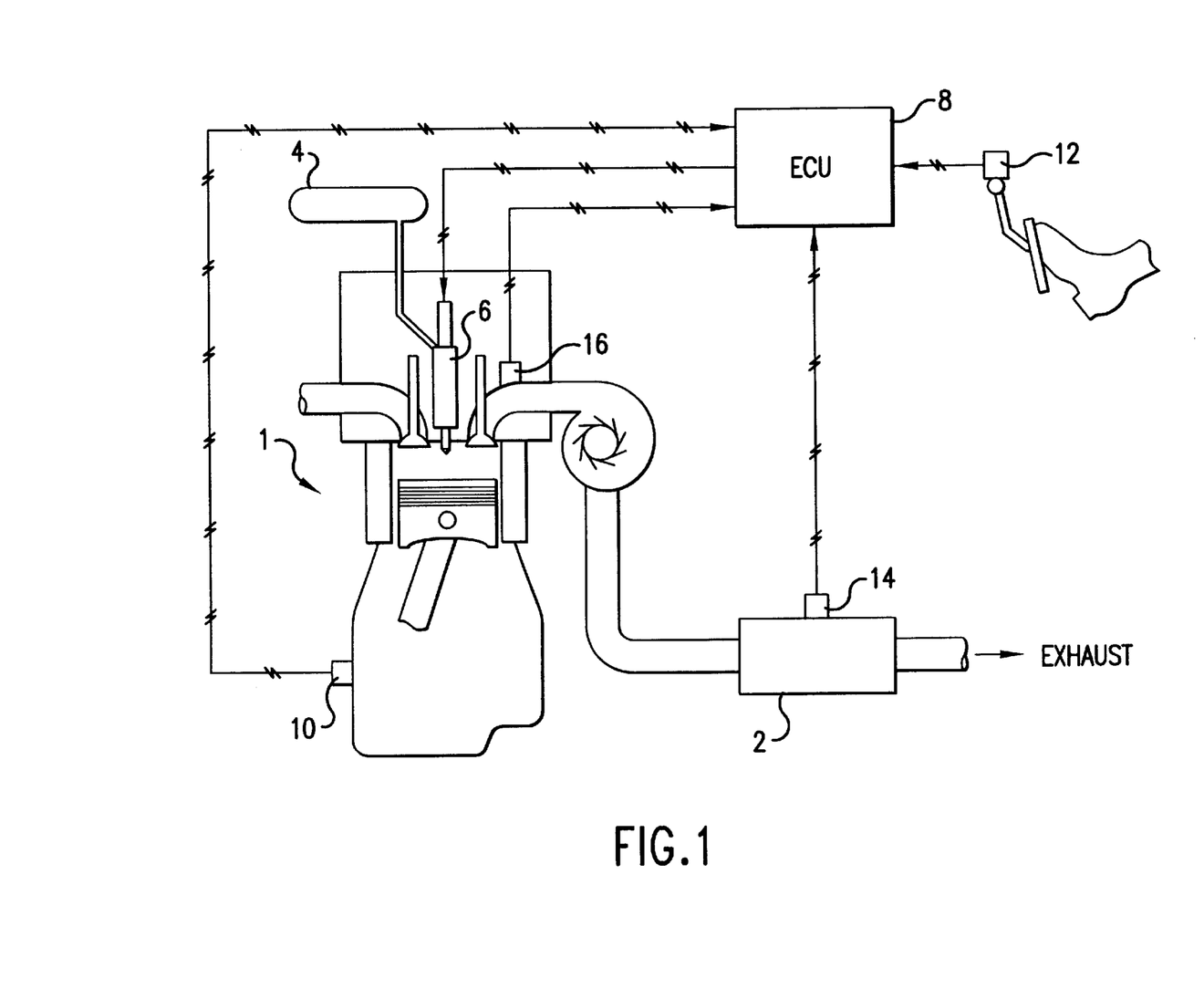
FIG. 1 is a schematic diagram showing an exhaust emission control system according to an embodiment of the present invention.

FIG. 1 is a schematic diagram showing the construction of an exhaust emission control system. A diesel particulate filter (hereinafter referred to as "DPF") 2 serving as an exhaust emission control device is disposed in an exhaust passage of an engine 1. The DPF 2 has a function of trapping particulate matters included in exhaust passing there through to control exhaust emission.

To supply fuel to the engine 1, a so-called common rail system is adopted which includes a common rail 4, a fuel injector 6, and an electronic control unit (hereinafter referred to as "ECU") 8. High-pressure fuel is supplied from a fuel tank via a high-pressure fuel supply pump (both of which are not illustrated in the drawings) and is accumulated in the common rail 4. The ECU 8 outputs an operation signal to the fuel injector 6 in order to cause the fuel injector 6 to open an injection valve thereof so that the fuel injector 6 can inject the fuel at a desired timing. For operation of the engine 1, the ECU 8 controls the fuel injection (main injection) quantity and the injection timing according to an operating state, for example. Accordingly, the ECU 8 has a function of controlling fuel injection, which is programmed in advance in order to properly carry out the main injection.

The exhaust emission control system according to the present invention is capable of post injection (sub injection) by using the above-described common rail system. Accordingly, the control function of the ECU 8 is also executed for control of the post injection in the exhaust emission control system (fuel injection device).

When providing control, the ECU 8 collects a variety of information from a variety of sensors disposed in various parts of the engine 1. More specifically, the ECU 8 receives a sensor signal from a crank angle sensor 10, and detects the engine speed Ne, crank angle CA, etc. of the engine 1 by operation of the sensor signal. The ECU 8 also receives a sensor signal from an accelerator position sensor 12 to detect an accelerator angle Acc based on the depression of an accelerator by a driver. All of such information is used as information representing the operating state of the engine 1 when the ECU 8 provides control (operating state detecting device).

Further, the ECU 8 receives a sensor signal representing the temperature information of the DPF 2 from a filter temperature sensor 14, and receives a sensor signal representing the temperature information of exhaust from an exhaust temperature sensor 16 (temperature detecting device).

The exhaust emission control system periodically carries out the post injection at regular intervals according to the running distance of a vehicle equipped with the exhaust emission control device in the case where particulate matters of an excessive weight are deposited on the DPF 2, the case where the engine 1 is continuously operated with a low load being applied thereto for a predetermined period of time, and the like. In any case, the post injection is intended to raise the exhaust temperature to accelerate oxidization of the particulate matters trapped in the DPU 2 by heat resulting from the post injection to thus regenerate the function of the DPF 2.

The post injection carried out by the exhaust emission control system is realized using the common rail system of the engine 1 as mentioned above. Thus, the ECU 8 causes the fuel injector 6 to inject fuel into cylinders in the main injection, and then outputs an operation signal to the fuel injector 6 so that a predetermined quantity of fuel can be injected in an expansion stroke. On this occasion, the ECU 8 controls the post injection timing according to the information representing the detected crank angle CA.

A detailed description will now be given of the controlling operation carried out by the ECU 8 in the post injection by way of specific embodiments.

First Embodiment

Figure 2:
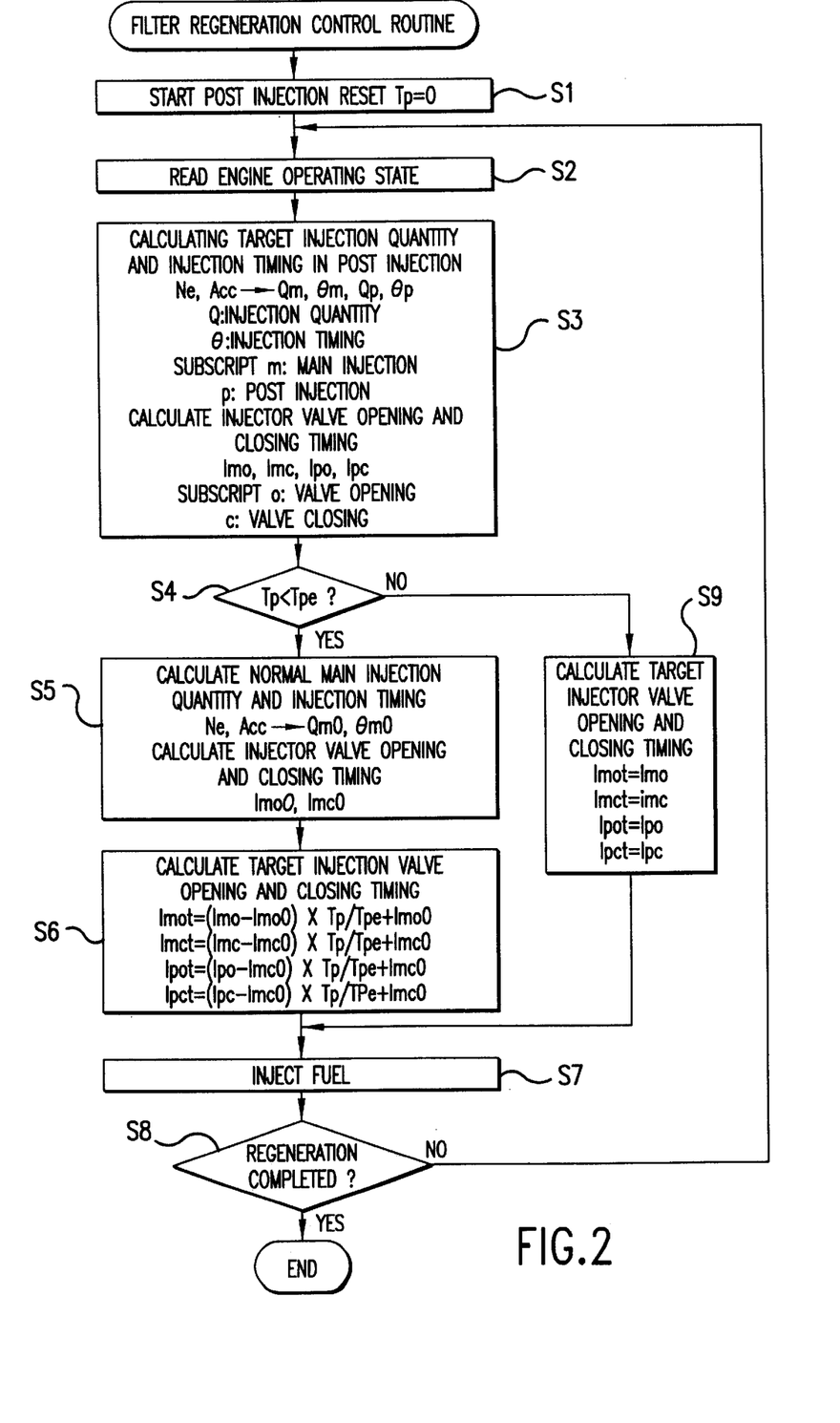
FIG. 2 is a flow chart showing a filter regeneration control routine that is executed in the first and second embodiments.

FIG. 2 shows the flow of the controlling operation carried out to change the post injection quantity and the injection timing as time passes from the start of the post injection controlling operation. When starting the post injection in a filter regeneration control routine, the ECU 8 resets a predetermined timer counter (Tp=0) first (step S1). The ECU 8 then reads information representing the operating state of the engine 1 from the above-mentioned variety of sensors to detect the engine speed Ne and the accelerator angle Acc (step S2).

The ECU 8 then calculates the target injection quantity and the target injection timing in the post injection (step S3) The target injection quantity and the target injection timing are calculated with respect to each of the main injection and the post injection, and the calculation can be made by searching predetermined control maps according to the engine speed Ne and the accelerator angle Acc, for example. A storage of the ECU 8 stores in advance a map for use in setting the target injection quantity Qm, Qp with respect to the main injection (hereinafter indicated by a subscript "m") and the post injection (hereinafter indicated by a subscript "p"), and a map for use in setting the target injection timing θm, θp with respect to the main injection and the post injection (target injection quantity setting device, target injection timing setting device). After setting the target injection quantity Qm, Qp and the target injection timing θm, θp, the ECU 8 calculates the valve opening timing Imc, Ipo and the valve closing timing Imo, Ipc of the injector 6 based on respective values of the target injection quantity Qm, Qp and the target injection timing θm, θp.

The ECU 8 then compares a value indicated by the timer counter Tp with a predetermined end time Tpe, and selects a process to be carried out next according to the result of the comparison (step S4). The end time Tpe is set as a time limit within which the actual post injection quantity and injection timing must be gradually changed to reach the target injection quantity and target injection timing. For example, the specific value of the end time Tpe may be preset, or may be set by the ECU 8 according to the engine speed Ne, the accelerator angle Acc, etc. representing the operating state (time setting device). In this case, a step of setting the end time Tpe may be added to the flow of the controlling operation shown in FIG. 2.

While the value indicated by the timer counter Tp is smaller than the value of the end time Tpe, the ECU 8 transitionally starts the post injection based on smaller injection quantity and earlier injection timing than the target values (Qp, θp) without carrying out the actual fuel injection based on the target injection quantity Qp and target injection timing θp preset for the post injection. The process then proceeds to a step S5 wherein the ECU 8 provides transitional control so as to calculate the main injection quantity and the injection timing with respect to the main injection in normal state, i.e. in the case where the post injection is not carried out. The main injection quantity Qm0 and the injection timing θm0 can be set referring to the predetermined main injection control maps. The ECU 8 searches the maps according to the engine speed Ne and the accelerator angle Acc, for example, to set the specific values (Qm0, θm0) thereof. The ECU 8 calculates the valve opening timing Imo0 and valve closing timing Imc0 of the injector 6 according to the set values.

The ECU 8 then calculates the valve opening timing and valve closing timing to actually operate the injector 6 according to the result of the above calculation (step S6). Specifically, the ECU 8 calculates the valve opening timing Imot, Ipot and valve closing timing Imct, Ipct of the injector 6 with respect to the main injection and the post injection. Upon elapse of the end time Tpe, the specific values of the valve opening timing Imot, Ipot and valve closing timing Imct, Ipct correspond to respective values of the above-mentioned valve opening timing Imo, Ipo and the valve closing timing Imc, Ipc. Preferably, the valve opening timing Imot, Ipot and the valve closing timing Imct, Ipct are calculated according to the following equations (1) to (4), for example:

$$Imot=(Imo-Imo0)\cdot Tp/Tpe+Imo0 \quad (1)$$

$$Imct=(Imc-Imo0)\cdot Tp/Tpe+Imc0 \quad (2)$$

$$Ipot=(Ipo-Imc0)\cdot Tp/Tpe+Imc0 \quad (3)$$

$$Imot=(Ipc-Imc0)\cdot Tp/Tpe+Imc0 \quad (4)$$

Upon completion of the above calculation, the ECU 8 outputs an operation signal to the injector 6 in the above timing (Imot, Ipot, Imct, Ipct) in synchronism with a crank angle pulse CA. This enables actual injection based on the injection quantity and injection timing, which are set with respect to the main injection and the post injection (step S7) (control device).

Figure 3:
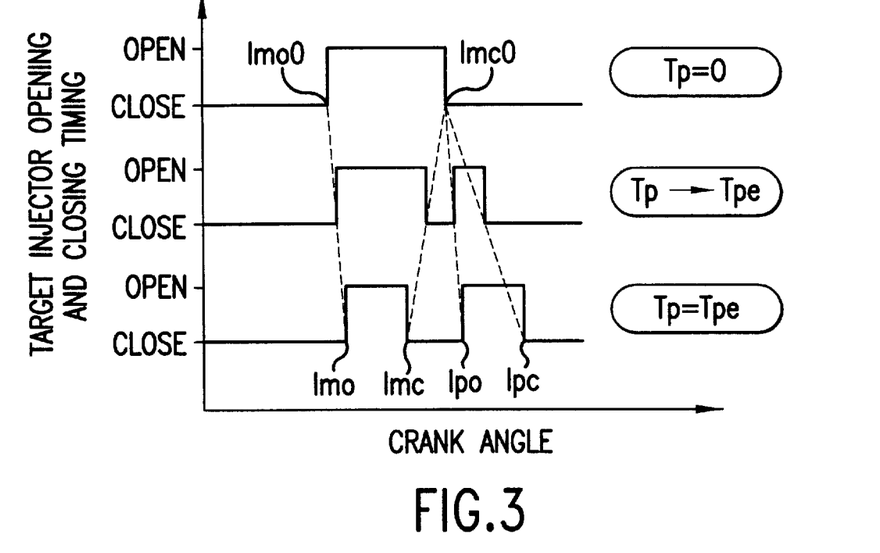
FIG. 3 is a timing chart showing changes in the injector opening and closing timing after the start of post injection.

FIG. 3 shows a change in the target injector valve opening and closing timing from the start of the post injection to the elapse of the end time Tpe. As described above, at a point in time when the timer counter is reset (Tp=0), the target injector valve opening timing and the target injector valve closing timing correspond to the normal valve opening timing Imo0 and the valve closing timing Imc0, respectively.

Thereafter, if the value indicated by the timer counter is increased (Tp<Tp3) as time passes, the injector 6 is further driven to carry out the post injection of fuel into the cylinders in the expansion stroke after the main injection. On this occasion, both the valve opening timing Ipot and the valve closing timing Ipct in the post injection are delayed as time passes, and the valve closing timing Ipct is substantially delayed according to an increase in the injection quantity. Upon elapse of the end time Tpe (Tp=Tpe), the injector 6 is opened and closed in the valve opening timing Ipo and the valve closing timing Ipc, respectively.

Figure 4:
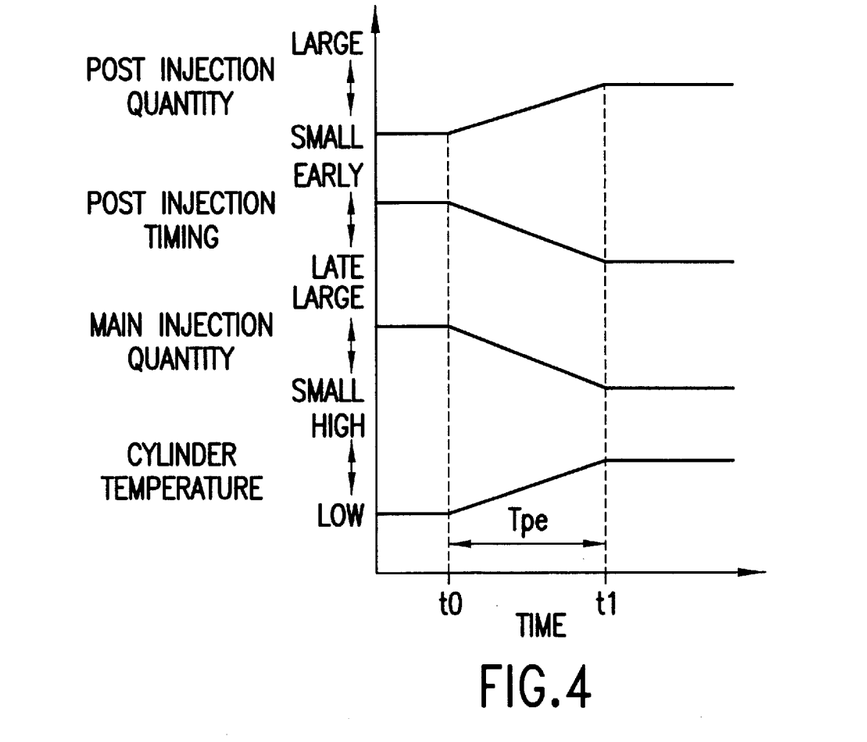
FIG. 4 is a diagram showing temporal changes in properties after the start of the post injection.

FIG. 4 shows temporal changes in various properties with the execution of the filter regeneration control routine. As a result of the control of the valve opening and closing timing of the injector 6 in the above-mentioned manner, the actual fuel injection quantity is gradually increased toward the target injection quantity Qp from the start of the post injection (time t0), and the injection timing is gradually delayed toward the target injection timing θp. Upon elapse of the end time Tpe (time t1), the actual post injection is carried out based on the target injection quantity Qp and the target injection timing θm.

After the elapse of the end time Tpe, the process proceeds from the step S4 (=No) to a step S9 to continue the post injection. On this occasion, the valve of the injector 6 is opened and closed with the valve opening timing Ipo and the valve closing timing Ipc being maintained (step S9), and thus, the actual post injection is carried out based on the target injection quantity Qp and the target injection timing θp.

Incidentally, in this control routine, the injection quantity and injection timing in the main injection are changed from the normal values in terms of an increase in torque resulting from the post injection. More specifically, as a result of the calculation of the valve opening timing Imot and the valve closing timing Imct according to the above equations (1) and (2), the main injection quantity is gradually decreased and the main injection timing is advanced as time passes (refer to FIG. 4).

Figure 5:
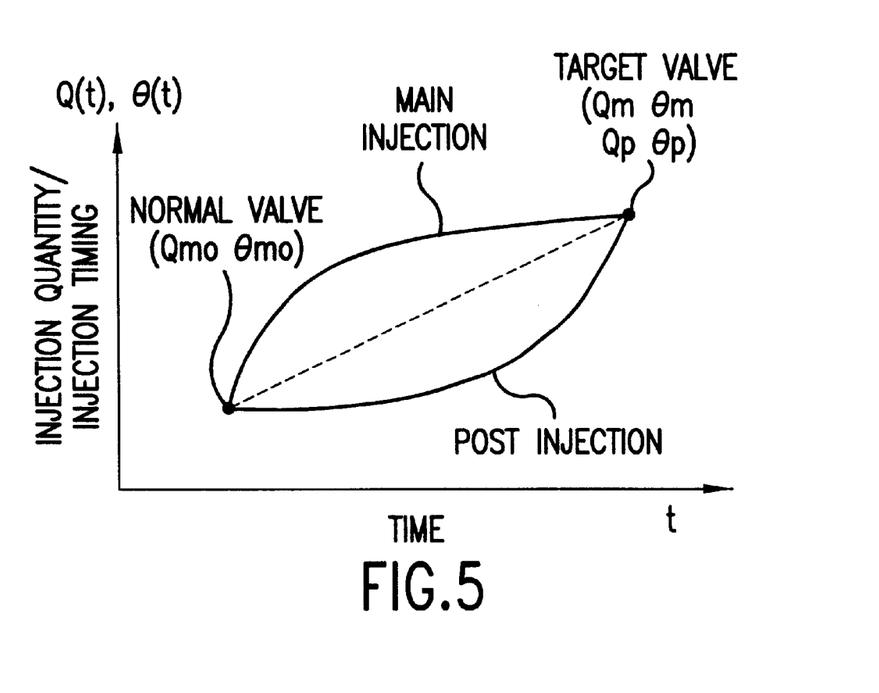
FIG. 5 is a diagram showing the transition of the injection quantity and injection timing to target values after the start of the post injection.

FIG. 5 shows the transition of the actual injection quantity Q (t) and injection timing θ (t) to the target values after the start of the post injection. In this control routine, the actual injection quantity Q (t) and injection timing θ (t) are controlled to become closer linearly (indicated by a broken line in FIG. 5) to the target injection quantity Qp and the target injection timing θp, but alternatively, they may be controlled to become closer non-linearly to the target values. Alternatively, only the post injection timing may be changed non-linearly to the target value, or the injection timing in the main injection and the injection timing in the post injection may be changed non-linearly (indicated by a solid line in FIG. 5) to the respective target values in different patterns.

As shown in FIG. 4, the cylinder temperature gradually rises from the start of the post injection (time t0), and a change in the cylinder temperature is stabilized after the elapse of the end time Tpe. On this occasion, the cylinder temperature satisfies the conditions under which the exhaust temperature can be increased in the most efficient manner in the case where the post injection is carried out based on the target injection quantity Qp and the target injection timing θm. Therefore, the cylinder temperature can be sufficiently raised before the exhaust temperature is increased steadily by the post injection to there by enable the filter to be regenerated under preferable conditions. Further, the torque is inhibited from changing rapidly at the start of the post injection to thus prevent the driver of the vehicle from being offended.

Upon start of the post injection, the rise in the exhaust temperature accelerates the oxidization of the carried out for a predetermined period of time for example, the DPF 2 is regenerated particulate matters in the DPF 2. If the post injection is continuously to be brought into a preferable state. Upon completion of the regeneration of the DPF 2, the ECU 8 terminates the execution of the filter regeneration control routine (step S8=Yes). This completes the post injection, and the process returns to a step wherein the ECU 8 carries out the normal fuel injection control routine.

Second Embodiment

A description will now be given of an embodiment in which the end time Tpe is freely set according to the power of the engine 1, for example.

Figure 6:
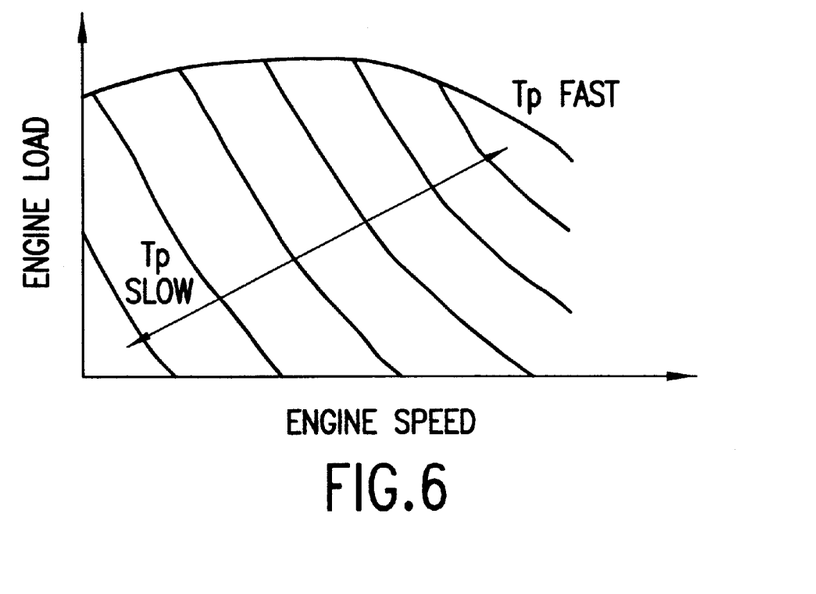
FIG. 6 is a diagram showing an example of maps for use in changing the advancement of a timer counter.

When executing the control routine in FIG. 2, the ECU 2 may change the progress of the timer counter Tp. FIG. 6 shows an example of a control map for use in changing the progress of the timer counter Tp, and the ECU 8 quickens and slows the progress of the timer counter Tp according to the control map. Specifically, the ECU 8 searches the map according to the information representing the engine speed Ne and the load (accelerator angle Acc), and quickens the progress of the timer counter Tp in a region of high engine speed and load and slows the progress of the timer counter Tp in a region of low engine speed and load. Repeating the search of the map integrates the results (progress). For example, it takes a shorter period of time to reach the end time Tpe in a higher power range of the engine 1 than in a lower and medium power range of the engine 1. To the contrary, it takes a longer period of time to reach the end time Tpe in the lower and medium power range than in the higher power range.

The reason why the end time Tpe is variably set is as follows. For example, the cylinder temperature rises faster during higher speed and load operation than in lower and medium speed and load operation. Therefore, changing the progress of the timer counter Tp according to the operation history of the engine 1 enables shift to the post injection under the optimum conditions within a shorter period of time than in the case where the end time Tpe is set to a fixed value.

Third Embodiment

Figure 7:
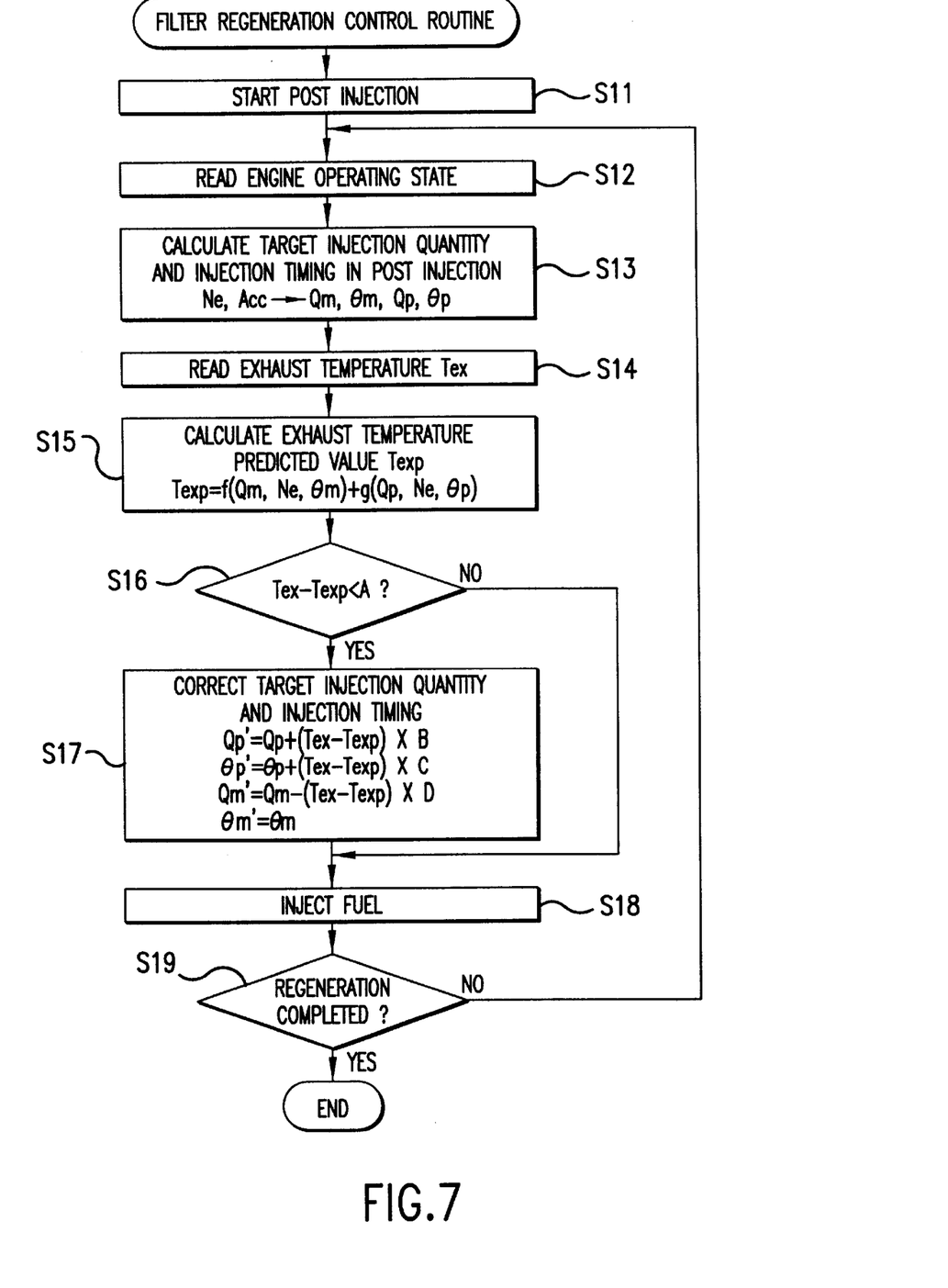
FIG. 7 is a flow chart showing a filter regeneration control routine that is executed in the third embodiment.

FIG. 7 is a flow chart showing a controlling operation that is carried out to correct the target values of the post injection quantity and injection timing by detecting the actual exhaust temperature after the post injection. This embodiment is referred to as "exhaust temperature feedback control".

In the control routine in FIG. 7, the above-mentioned timer counter Tp is not used when the ECU 8 starts the post injection (step S11). In this case, the ECU 8 reads the operating state of the engine 1 (e.g. engine speed Ne and accelerator angle Acc) (step S12), and then sets the target injection quantity Qm, Qp and the target injection timing θm, θp with respect to the main injection and the post injection (step S13). It should be noted that these steps of operations are carried out according to the same procedure as in the first embodiment.

The ECU 8 then reads the exhaust temperature Tex according to a signal transmitted from the exhaust temperature sensor 16 (step S14), and then predicts the exhaust temperature (step S15). On this occasion, a predicted value of the exhaust temperature is found by adding together, for example, the exhaust temperature calculated based on the target injection quantity Qm, target injection timing θm, θp, and engine speed Ne, and an increase in the exhaust temperature calculated based on the target injection quantity Qp, target injection timing θp, and engine speed. The storage of the ECU 8 stores in advance maps (maps f and g in the drawing) that provides a predicted value of the exhaust temperature and an increase in the exhaust temperature (corresponding to functions f and g in FIG. 7) according to the injection quantity and the engine speed. The ECU 8 finds the predicted value Texp of the exhaust temperature by searching the maps (predicting device). On this occasion, the exhaust temperature is preferably detected at a position which is as close as possible to the cylinder, and in FIG. 1, the exhaust temperature sensor 16 is disposed at a position which is as close as possible to an exhaust valve.

The ECU 8 then compares the detected value Tex of the exhaust temperature and the predicted value Texp of the exhaust temperature, and selects a process to be carried out next according to the result of the comparison (step S16). After the start of the post injection, if the conditions such as the cylinder temperature are still unsuitable for raising the exhaust temperature by the post injection, the actual post injection cannot satisfactorily raise the exhaust temperature considering the quantity of injected fuel due to insufficient combustion of the fuel. For this reason, there is usually a difference between the detected value Tex and the predicted value Texp for a while after the start of the post injection; i.e. the actual detected value Tex is lower than the predicted value Texp.

On this occasion, the ECU 8 finds a temperature difference between the detected value Tex and the predicted value Texp (=Tex−Texp), and starts a process for correcting the target value (step S17) if the actual exhaust temperature Tex is lower than the predicted exhaust temperature Texp by a value in excess of a predetermined temperature difference A.

The target injection quantity Qm, Qp and the target injection timing θm, θp can be corrected based on the temperature difference (=Tex−Texp). Specifically, the ECU 8 multiplies the temperature difference by a predetermined correction coefficient B, C, D, or the like, and adds or subtracts a resulting value to or from the target value to thus find a corrected target value (e.g. Q'p, θ'p, Q'm, θ'm). Preferred examples of equations for correction are as follows (equations (5) to (8)):

$$Q'p = Qp + (Tex - Texp) \cdot B \quad (5)$$

$$\theta'p = \theta p + (Tex - Texp) \cdot C \quad (6)$$

$$Q'm = Qm + (Tex - Texp) \cdot B \quad (7)$$

$$\theta'm = \theta m \quad (8)$$

As is clear from the abode equations (5) to (7), adding or subtracting the temperature difference (negative value) makes the post injection quantity Q'p smaller than the target injection quantity Qp and makes the injection timing θ'p earlier than the target injection timing θp. On the other hand, the corrected main injection quantity Q'm is larger than the target value Qm due to the decrease in the post injection quantity, and this provides necessary combustion torque. As is clear from the above equation (8), the main injection timing θ'm is virtually uncorrected, and the target value θm is merely assigned to the main injection timing θ'm.

Upon completion of the above calculation, the ECU 8 carries out the actual fuel injection according to the corrected target values (Q'p, θ'p, Q'm, θ'm). Although not particularly illustrated in FIG. 7, the ECU 8 calculates the valve opening and closing timing of the injector 6 based upon the target values and the like, and outputs an operation signal to the injector 6 according to the result of the calculation, as is the case with the first embodiment. As a result, the actual main injection and the post injection are carried out based on the respective corrected target values (control device).

After the start of the post injection, the ECU 8 provides control of the fuel injection while repeating the above-described correction, and this gradually reduces the difference between the actual detected temperature Tex and the predicted temperature Texp. With the repetition of the correction, the respective corrected target values (Q'p, θ'p, Q'm, θ'm) gradually become closer to the initial target values (e.g. Qp, θp, Qm, θm), and the ECU 8 completes the correction of the target values at a point in time when the temperature difference (Tex−Texp) becomes smaller than the predetermined value A. The ECU 8 controls the fuel injection while skipping the correction process (step S17) so that the actual fuel injection can be carried out based on the set target values (Qp, θp, Qm, θm). The control routine is terminated according to the same procedure as in the first embodiment (step S19).

By executing the control routine according to the present embodiment, the actual injection quantity and injection timing are specifically changed with an extent to which the combustion caused by the post injection contributes to the increase in actual exhaust temperature being taken into consideration. Therefore, for example, in the case where the cylinder temperature is relatively low when the engine 1 is started at a low temperature or in the case where the cylinder temperature is sufficiently raised due to continuous high-load operation or the like, the post injection quantity Q'p and injection timing θ'p can be determined according to different conditions to raise the exhaust temperature within the minimum period of time.

According to the above-described embodiments, the post injection can be carried out under the optimum conditions such as the cylinder temperature. Therefore, the fuel can always be combusted sufficiently after the start of the post injection, and this substantially reduces the emission of HC and the like. Further, the target injection quantity Qp and the target injection timing θp can be preset considering the case where the conditions such as the cylinder temperature are optimized, and thus, the filter regeneration performance can be stabilized under the optimum conditions during the post injection. In other words, if the control operation according to the above-described embodiments is not carried out, the post injection quantity and injection timing must be set supposing that the conditions such as the cylinder temperature are not satisfactory, and therefore, the set injection quantity is smaller than the target injection quantity Qp under the optimum conditions and the set injection timing is earlier than the target injection timing θm under the optimum conditions.

To the contrary, the execution of the control routine according to the above-described embodiments enables the exhaust temperature to be raised within the minimum period of time according to the present operating state and the conditions such as the cylinder temperature. Thus, the total post injection period can be reduced in one filter regeneration cycle, and the deterioration of the fuel economy is reduced to the minimum level. Even in the case of a vehicle that travels a short distance for a short period of time at a time, the filter can be regenerated satisfactorily within the period due to the reduction in the total post injection period.

Further, the reduction in the post injection period also contributes to a reduction in dilution of lubricant caused by the injected fuel, and this is advantageous in terms of maintenance of the internal combustion engine.

In the above-described embodiments, the main injection quantity and injection timing are controlled during the controlling operation in the post injection, and therefore, the above-described embodiments are advantageous in that the increase in the torque as well as the rise in the exhaust temperature resulting from the post injection are taken into consideration.

It should be noted that all of the control routines according to the above-described embodiments are only preferred examples, and it is possible to arbitrarily modify the process steps of the control routines. Further, it should be understood that the equations should not be restricted to those of the above-described embodiments, but other equations may be adopted.

Further, the exhaust emission control device in FIG. 1 is only one form suitable for a diesel engine for use in vehicles, and for example, the above-described post injection may be applied to a three-way catalyst of a direct injection gasoline engine. Namely, it goes without saying that the embodiments of the present invention may be modified according to the form of the internal combustion engine, the purpose of the internal combustion engine, and the like.

What is claimed is:

1. An exhaust emission control system of an internal combustion engine having a fuel injection device that carries out main injection of fuel into cylinders of the internal combustion engine and then carries out sub injection of additional fuel in an expansion stroke, comprising:
    an exhaust emission control device disposed in an exhaust passage of the internal combustion engine and reduces harmful matters in exhaust;
    an operating state detecting device that detects an operating state of the internal combustion engine;
    a target injection timing setting device that sets a target injection timing for the sub injection based on the operating state of the internal combustion engine; and
    a control device that provides a control such that an actual injection timing for the sub injection is set at a point earlier than the set target injection timing when the sub injection is started, and the actual injection timing for the sub injection is then delayed thereafter such that the actual injection timing becomes closer to set target injection timing.

2. An exhaust emission control system of an internal combustion engine according to claim 1, further comprising:
    a target injection quantity setting device that sets a target injection quantity of fuel for the sub injection according to an operating state of the internal combustion engine,
    wherein said control device provides control such that an injection quantity for the sub injection is set to a smaller value than the target injection quantity when the sub injection is started, and the injection quantity for the sub injection is increased to the target injection quantity.

3. An exhaust emission control system of an internal combustion engine according to claim 2, wherein said operating state detecting device has an engine speed detecting device that detects an engine speed and an engine load detecting device that detects an engine load, and said target injection quantity setting device sets the target injection quantity according to the detected engine speed and the detected engine load.

4. An exhaust emission control system of an internal combustion engine according to claim 1, further comprising:
    a time setting device that sets a predetermined end time according to an operating state of the internal combustion engine when said fuel injection device starts the sub injection,
    wherein said control device provides control such that an actual injection quantity is gradually increased toward the target injection quantity since a starting point of the sub injection until elapse of the end time, and the actual injection timing is gradually delayed toward the set target injection timing so that the actual injection quantity and the actual injection timing correspond to the target injection quantity and the set target injection timing at a point in time when the end time elapses.

5. An exhaust emission control system of an internal combustion engine according to claim 4, wherein said time setting device is changed according to a power range of the internal combustion engine.

6. An exhaust emission control system of an internal combustion engine according to claim 5, wherein said time setting device sets the end time such that a shorter end time is set for a higher power range of the internal combustion engine.

7. An exhaust emission control system of an internal combustion engine according to claim 4, wherein said time setting device sets the end time according to a progress speed of a timer counter in a control routine changed according to at least information representing an engine speed and a load.

8. An exhaust emission control system of an internal combustion engine according to claim 1, further comprising:

a predicting device that predicts an exhaust temperature in a case where the sub injection is carried out based on the target injection quantity and the set target injection timing; and a temperature detecting device that detects an actual exhaust temperature after the sub injection, wherein said control device corrects the target injection quantity and the set target injection timing according to the detected exhaust temperature detected by the detected temperature detecting device and the exhaust temperature predicted by the predicting device.

9. An exhaust emission control system of an internal combustion engine according to claim 1, wherein said operating state detecting device has an engine speed detecting device that detects an engine speed and an engine load detecting speed that detects an engine load, and said target injection timing setting device sets the target injection timing based on the detected engine speed and the detected engine load.

10. An exhaust emission control system of an internal combustion engine according to claim 1, wherein said control device provides control such that the actual injection timing for the sub injection is gradually delayed towards the set target injection timing.

11. An exhaust emission control system of an internal combustion engine according to claim 10, wherein said control device provides control such that the injection timing in the main injection is advanced as the actual injection timing for the sub injection is gradually delayed.

12. An exhaust emission control system of an internal combustion engine according to claim 1, wherein said control device provides control such that the injection quantity for the sub injection is gradually increased to a injection quantity.

13. An exhaust emission control system of an internal combustion engine according to claim 12, wherein said control device provides control such that the injection quantity for the main injection is reduced as the actual injection timing for the sub injection is gradually delayed.

14. An exhaust emission control system of an internal combustion engine according to claim 1, wherein said exhaust emission control device is a filter that traps particulate matters included in exhaust.

15. The method of an exhaust emission control system of an internal combustion engine having a fuel injection device that carries out main injection of fuel into cylinders of the internal combustion engine and then carries out sub injection of additional fuel in an expansion stroke and an exhaust emission control device disposed in an exhaust passage of the internal combustion engine and reduces harmful matters in exhaust, comprising:

detecting an operating state of the internal combustion engine;

setting a target injection timing for the sub injection based on the operating state of the internal combustion engine;

setting an actual injection timing of the sub injection at a point earlier than the set target injection timing; and delaying said actual injection timing closer to the set target injection timing thereafter.

16. The method of claim 15, further comprising:

setting a target injection quantity for the sub injection according to the operating state of the internal combustion engine;

setting an injection quantity for the sub injection to a smaller value than the target injection quantity; and increasing said injection quantity to the target injection quantity.

17. The method of claim 16, further comprising:

setting a predetermined end time according to an operating state of the internal combustion engine, wherein an actual injection quantity is gradually increased toward the target injection quantity since a starting point of the sub injection until elapse of the end time, and the actual injection timing is gradually delayed toward the target injection timing so that the actual injection quantity and the actual injection timing correspond to the target injection quantity and the target injection timing at a point in time when the end time elapses.

18. The method of claim 17, further comprising:

changing said predetermined end time according to a power range of the internal combustion engine.

19. The method of claim 15, further comprising:

advancing an injection timing in the main injection during the step of delaying the actual injection timing for the sub injection.

20. The method of claim 19, further comprising:

reducing an injection quantity for the main injection during the step of delaying the actual injection timing for the sub injection.

* * * * *